US006431735B2

(12) United States Patent
Fraizer

(10) Patent No.: US 6,431,735 B2
(45) Date of Patent: Aug. 13, 2002

(54) VEHICLE HEADLAMP, LAMP LENS AND METHOD FOR PRODUCING A LAMP LENS

(75) Inventor: Robert L. Fraizer, Seymour, IN (US)

(73) Assignee: Valeo Sylvania L L.C., Seymour, IN (US)

( * ) Notice: Subject to any disclaimer, the term of this patent is extended or adjusted under 35 U.S.C. 154(b) by 0 days.

(21) Appl. No.: 09/334,825

(22) Filed: Jun. 17, 1999

(51) Int. Cl.⁷ .............................. B32B 7/02; B32B 17/06; B60Q 1/00
(52) U.S. Cl. ..................... 362/509; 362/510; 427/168; 427/427; 427/164; 427/407.1; 428/412; 428/423.1; 428/411.1; 428/216; 428/217; 428/334; 428/420
(58) Field of Search ................... 362/509, 510, 362/311, 351; 427/407.1, 407.2, 248.1, 421, 164, 165, 168, 427, 402; 428/412, 423.1, 411.1, 447, 448, 451, 215, 216, 217, 334, 335, 336, 420

(56) References Cited

U.S. PATENT DOCUMENTS

| | | | |
|---|---|---|---|
| 4,101,513 A | * 7/1978 | Fox et al. | 428/423.1 |
| 4,708,908 A | * 11/1987 | Tateoka et al. | 428/423.1 |
| 5,190,807 A | * 3/1993 | Kimock et al. | 428/216 |
| 5,493,483 A | 2/1996 | Lake | |
| 5,571,570 A | 11/1996 | Lake | |
| 5,846,649 A | * 12/1998 | Knapp et al. | 428/334 |
| 5,880,171 A | * 3/1999 | Lim et al. | 523/106 |
| 5,922,459 A | 7/1999 | Huang | |
| 5,931,566 A | * 8/1999 | Fraizer | 362/293 |
| 5,985,420 A | * 11/1999 | Haga et al. | 428/212 |

FOREIGN PATENT DOCUMENTS

| | | | |
|---|---|---|---|
| DE | 2006945 | * | 10/1979 |
| GB | 2006945 | | 5/1979 |
| JP | 9230109 | * | 1/1998 |

\* cited by examiner

*Primary Examiner*—Thomas M. Sember
(74) *Attorney, Agent, or Firm*—William E. Meyer

(57) ABSTRACT

A lamp lens, and method for producing such lens, is provided which includes a clear plastic substrate. A soft, flexible layer is sandwiched between the substrate and an outer abrasion resistant layer. The material which forms each layer is intermixed at the interface of the layers. In this manner, a multilayer film may be provided upon the substrate wherein a hard outer layer stays on top of a softer layer adhered to the plastic substrate. A vehicle headlamp which includes such a lamp lens is also provided.

7 Claims, 2 Drawing Sheets

VEHICLE HEADLAMP, LAMP LENS AND METHOD FOR PRODUCING A LAMP LENS

TECHNICAL FIELD

The present invention relates to a lamp lens, and particularly to an exterior vehicle lamp lens such as an automotive headlamp lens. A method for fabricating such a lamp lens, and a lamp which includes such a lamp lens, is also disclosed.

BACKGROUND ART

The lamp lens of the present invention is illustrated herein with reference to an automotive headlamp lens. However, it will be apparent to those skilled in the art that the lamp lens of the present invention is not limited to such an application.

The use of automotive headlamps in the form referred to in the art as a glass sealed beam is well known. In use, such lamps are subjected to intense environmental conditions which tend to lower the overall performance and longevity of the lamps. For example, it is not uncommon for the outer surface of such lamps to be eroded during use by road grit, sand, stones and the like. Various efforts have been made to overcome such problems. In 1995, the National Highway Traffic Safety Administration permitted the use of replaceable headlamp lenses. Since then, replaceable lamp lenses have been commercialized in some applications to replace the conventional glass sealed beams. For example, in the heavy truck industry lamps having plastic lenses are beginning to replace glass sealed beams. One replaceable lens which has been particularly satisfactory is a polycarbonate lens.

The use of a replaceable polycarbonate lens provides one solution to the problem of deterioration in lighting performance caused by environmental conditions. However, such solution has not been without concern regarding cost. For example, the typical replaceable plastic lens requires that the headlamp design incorporate a gasket with lens clips rather than a simpler and less expensive adhesive seal. This has been a particular concern in the heavy truck industry where lens replacement tends to be more frequent.

Efforts have been made to reduce the frequency of lens replacement by providing a more durable lens. For example, it is known to provide the typical polycarbonate lens with a hard coating to protect the lens from environmental damage. Heretofore, such attempts have been compromised due to the inconsistent requirements that the coating be sufficiently soft to absorb impact and sufficiently hard to provide hard abrasion resistance properties to prevent marring. As a result of this compromise, materials presently in use must balance such properties to meet both requirements, and such balancing tends to lower the overall performance.

The demand in the industry for better performance and longevity of lamp lenses has intensified. Customers of headlamp manufacturers are presently requesting that headlamps perform satisfactorily for 200,000 miles or the life span of the vehicle. However, materials available in the industry for use in fabricating the conventional polycarbonate lamp lenses provide only four or five years weathering performance before reaching the standard specified maximum of 7% haze in the polycarbonate lens. One problem is that although a hard coating generally resists erosion of the lens outer surface caused by grit, sand, stones and other debris from the road surface striking the plastic lens, the coating tends to chip off of the polycarbonate substrate when subjected to heavy impacts. Efforts to provide a softer material provides a lens coating which creates a flexible cushion that permits the surface coating to flex under heavy impacts and thereby resist chipping. However, a soft lens coating quickly erodes or becomes dull. In particular, lenses having soft coatings fail to pass the required conventional (FMVSS-108) steel wool scratch test.

DISCLOSURE OF THE INVENTION

It is an object of the present invention to provide an improved lamp lens. Another object of the present invention is to obviate the disadvantages of the prior art by providing an improved lamp lens.

A further object of the present invention is to provide a lamp lens having improved overall performance and longevity.

It is still another object of the present invention to provide a lamp lens which resists erosion by grit, sand, stones and other debris.

Another object of the present invention is to provide a lamp lens which has sufficient hardness to provide abrasion resistance and sufficient softness to absorb impact of grit, sand, stones and other debris.

Yet another object of the present invention is to provide a lamp lens the surface of which does not become pitted or otherwise chipped.

A further object of the present invention is to provide a lamp lens which provides satisfactory impact resistance and meets a standard steel wool scratch test.

Another object of the present invention is to provide an exterior vehicle lamp which satisfies any one or more of the foregoing objects.

Yet a further object of the present invention is to provide a vehicular headlamp having a lens which satisfies any one or more of the foregoing objects.

Still another object of the present invention is to provide a method for producing a lamp lens which satisfies any one or more of the foregoing objects.

This invention achieves these and other objects by providing a lamp lens which comprises a clear lens base having an inner surface and an opposite outer surface. A flexible first layer is adjacent the outer surface. An abrasion resistant second layer is adhered to the first layer. The first layer is softer than the second layer. A method for producing, and a vehicular headlamp comprising, the lamp lens of the present invention is also provided.

BRIEF DESCRIPTION OF THE DRAWINGS

This invention may be clearly understood by reference to the attached drawings in which like reference numerals designate like parts and in which.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
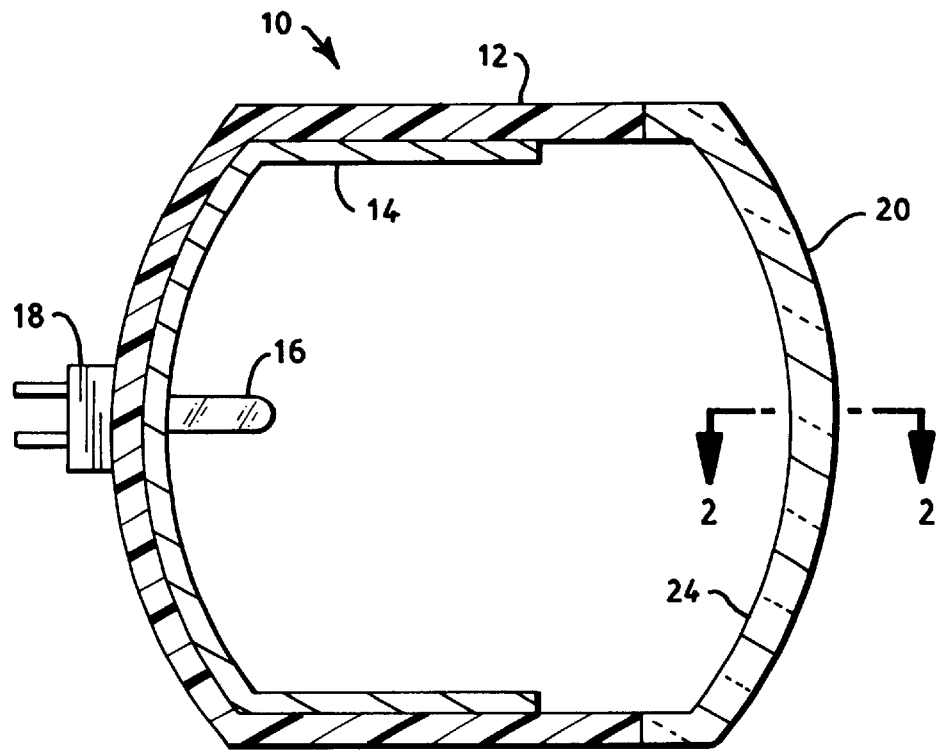
FIG. 1 is a partial sectional view of one embodiment of a headlamp and a lamp lens of the present invention.

Referring to the drawings, FIG. 1 is illustrative of a vehicle headlamp 10. Headlamp 10 comprises a housing assembly 12 having a reflector 14. A lamp 16 connected to a connector 18 is supported within the housing assembly relative to the reflector in a conventional manner. The housing assembly 12 is enclosed by a lamp lens 20 attached thereto. Lamp lens 20 is one embodiment of the present invention.

Figure 2:
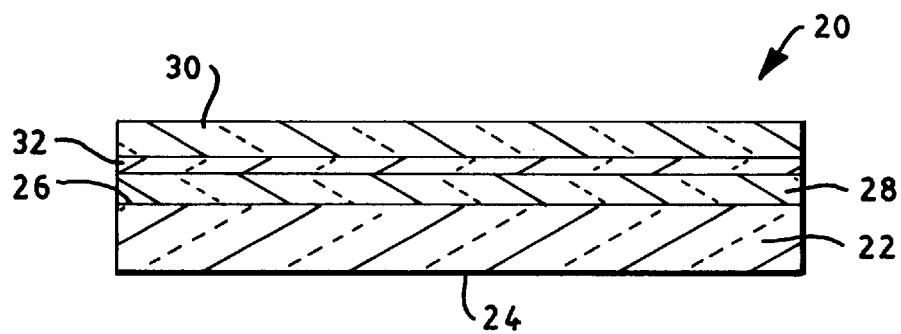
FIG. 2 is a sectional view of FIG. 1 taken along lines 2—2.

Referring to FIG. 2, lamp lens 20 comprises a clear lens base 22 having an inner surface 24 which is structured and arranged to face the lamp 16, and an outer surface 26 which is structured and arranged to face away from lamp 16. A flexible first layer 28 is adjacent the outer surface 26 and an abrasion resistant second layer 30 is adhered to the first layer 28. The layer 28 is softer than the layer 30 as described in some detail hereinafter.

In the embodiment illustrated in the drawings, the clear lens base 22 is a hard plastic material. In the preferred embodiment, base 22 is a clear polycarbonate. Polycarbonate is a conventional plastic material used in the fabrication of automotive headlamp lenses. The Rockwell Hardness of uncoated polycarbonate per ASTM D 785 is 75 on the M scale.

In the embodiment illustrated in the drawings, the layer 28 comprises a flexible coating and the layer 30 comprises an abrasion resistant coating. In a preferred embodiment, the flexible coating is a hardcoat sold by Red Spot Paint of Evansville Indiana and identified as UVT-152Q. In a preferred embodiment, the abrasion resistant coating 30 is sold by Red Spot Paint and identified as UVT-200AC-5. Alternative, abrasion resistant materials are UVT-146 and UVT-400. The UVT-152Q and UVT-200AC-5 coatings are materials which are curable by ultraviolet light. During the application of the coatings, the coatings 28 and 30 will intermix at the interface 32 between the coatings as described hereinafter. In this manner, the lens 20 will include the clear lens base 22, first layer 28 and second layer 30, the portions of the first and second layer at the interface 32 being intermixed or alloyed.

Figure 3:
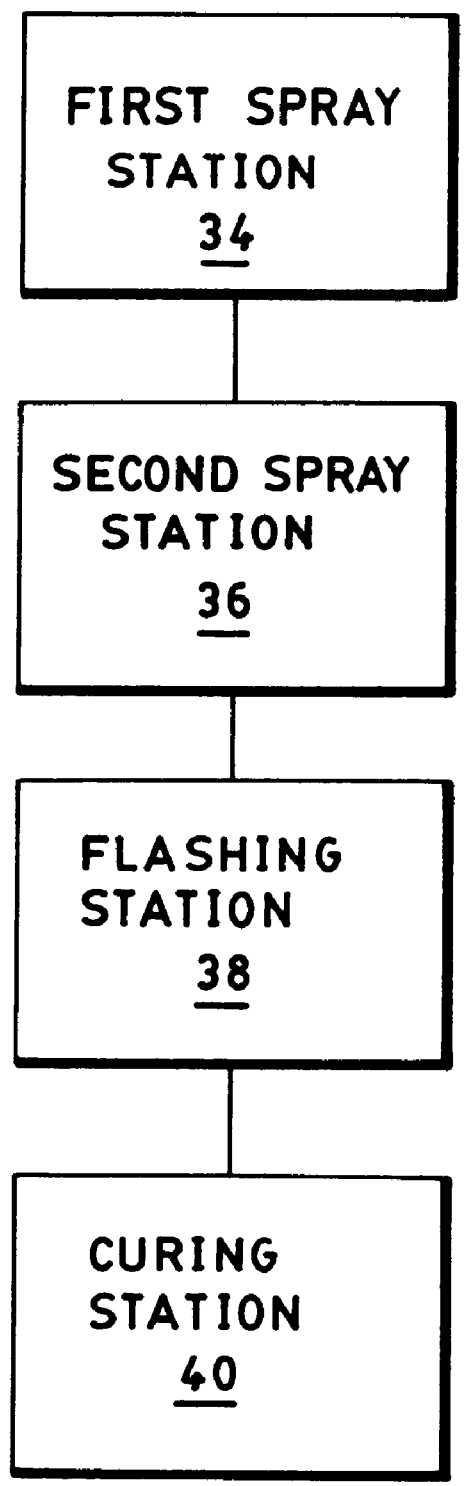
FIG. 3 is a schematic representation of one embodiment of a method of producing a lamp lens of the present invention.

In considering the fabrication of the lamp lens 20, the flexible first layer 28 is applied over the outer surface 26 of the lamp lens, and the abrasion resistant layer 30 is applied over the flexible first layer. One example of such application is schematically illustrated in FIG. 3. In particular, the UVT-152Q coating is applied to the lamp lens 20 substrate at a first spray station 34 by wet spraying surface 26 of the polycarbonate lens 20 with UVT-152Q. Such spraying may be effected in the presence of a solvent. For example, the UVT-152Q coating may be sprayed upon the substrate 20 in the presence of about 95% acetone and about 5% secondary butanol. In the preferred embodiment, the coating 28 of UVT-152Q is about 9 to 15 microns thick. The lens is then transferred to a second spray station 36 where the UVT-200AC-5 coating is applied over the UVT-152Q coating. The UVT-200AC-5 coating is applied by wet spraying on top of the still wet layer of UVT-152Q. Such spraying is effected in the presence of a solvent. For example, the UVT-200AC-5 may be sprayed upon the wet UVT-152Q coating in the presence of about 95% acetone and about 5% secondary butanol. In the preferred embodiment, the coating 30 of UVT-200AC-5 is about 3 to 8 microns thick. Due to the induced stress from shrinking of the coatings during cure, the total maximum thickness of the UVT-152Q and UV-200AC-5 coatings should not exceed about 20 microns. The thinner the combined coatings, the less stress induced during curing and therefore the better the impact performance. Spraying the wet UVT-200AC-5 coating over the still wet UVT-152Q coating causes the two layers 28 and 30 to intermix or alloy at the interface 32 between the two layers. In a preferred embodiment, the thickness of the interface is about 0.25 to 1.0 micron. The intermixing at the interface improves overall performance of the lamp lens by allowing the abrasion resistant hard outer layer 30 to more readily stay on top of the flexible soft inner layer 28.

The substrate with the UVT-152Q and UVT-200AC-5 coatings applied as described herein, is then transferred to a flashing station 38 where the two wet layers are flashed with infrared energy to drive off the solvent. It should be noted that typically there will be some loss of the solvent due to ambient temperature and air flow as the lens is transferred from the first spray station 34 to the second spray station 36. The coated lens is then transferred to a curing station 40 where the lens is passed by ultraviolet lamps which cure the UVT-152Q and UVT-200AC-5 layers by exposing the layers to ultraviolet light. Curing may take about 30 seconds depending upon the thickness of the coatings.

EXAMPLE 1

A lamp lens in accordance with the present invention was fabricated in the following manner. A clear lens base was provided using a General Electric LS2-111 polycarbonate substrate. One surface of the substrate was coated with UVT-152Q to a thickness of about 12 microns by spraying the substrate in a first spray station. While still wet, the coated substrate was transferred to a second spray station where the wet UVT-152Q coating was coated with UVT-200AC-5 to a thickness of about 5 microns. In particular, the UVT-200AC-5 was sprayed over the UVT-152Q wet on wet. Both coatings were effected in the presence of a solvent in the form of 95% acetone and 5% secondary butanol. The coated substrate was then transferred to a flashing station where the film-like layers of UVT-152Q and UVT 200AC-5 were flashed with infrared energy to drive off the solvent. Flashing occurred for 2 minutes at 165° F. The coated substrate was then transferred to a curing station where it was cured using 600 w/in. ultraviolet lamps at 4500 mJ. The lamp lens fabricated in this manner meets all of the objects of the present invention.

The lamp lens of the present invention has improved overall performance and longevity. The hard, abrasion resistant layer 30 resists erosion by grit, sand, stones and other debris. The softer layer 28 is sufficiently soft to provide improved impact and weathering properties. Applying a thin wet film 30 upon a thin wet film 28 provides a lens film which obtains the best properties of each. The alloyed interface 32 improves the adherence of the layers 28 and 30 to each other.

The lamp lens of the present invention provides satisfactory impact resistance and weathering performance yet is still able to meet industry standard steel wool scratch testing. The lamp lens of the present invention satisfies other standard industrial tests including Taber Abrasion per ASTM D 4060-90, Falling Sand Abrasion per ASTM D 968-93, Pencil Hardness per ASTM D 3363 and Chip Resistance SAE J400. The lamp lens of the present invention also satisfies the standard industrial chemical, weathering wear and similar tests.

The lamp lens of the present invention is particularly useful, and achieves all of the foregoing results, when used with a vehicular headlamp.

EXAMPLE 2

The preferred method of manufacturing is to apply a highly flexible impact resistant coating (UVT-152) at a film thickness of between 9 to 15 microns followed by a infrared light flash for 2 minutes with a part temperature of 165° F. or more, cooling the part and then applying a second robotic application of a tough outer layer of (UVT-146 or UVT-200 or UVT-400) at a thickness of between 3 to 8 microns to finish the film combination. The coating is again exposed to an infrared light flash zone to remove the remaining solvents from the film before being exposed to a total dosage of between 6,000 to 8,000 mJ of ultraviolet light energy. The carrier solvent used in both formulations consists of 95 percent acetone and 5 percent Isobutyl Alcohol and is applied at percent solids of 42% +/−2. The thickness of each coating can be increased or decreased depending on the final properties the user is requiring.

Thicker films require longer flash and more ultraviolet light dosage to cure them but generally provide more impact durability and weathering resistance in the field. The formation of the intercoat adhesion between the Polycarbonate and the first film was found to be critical during early trials. Controlling the flash time and temperature before the application of the second layer critical to form good adhesion to the Polycarbonate. The second effect observed was the loss of the abrasion resistance properties of the final layer, if the layer was allowed to mix into the first layer too long before curing. Some mixing between layers should occur to improve the intercoat adhesion, but should be controlled during the infrared light flash zone exposure.

Alternate methods of manufacturing this invention include application of the first film without wetting agents at the same thickness, flashing the solvent and then ultraviolet light curing the lens. The product may be passed through the second spray application to receive the next coat of harder material for abrasion resistance. This method would likely increase the scrap and cost due to the longer time required between steps and would increase the potential for contamination to adhere to the wet coating between each curing cycle.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

I claim:

1. A method for producing a lamp lens comprising the steps of:

applying a flexible layer over an outer surface of a clear lens base;

and applying an abrasion resistant layer over said flexible layer wherein said first applying step comprises wet spraying a first coating curing to a flexible material on said outer surface of said clear lens base, and said second applying step comprises wet spraying a second coating curing to an abrasion resistant material on top of said first coating while said first coating is still wet thereby forming an interface layer between said first and second coatings, said interface layer comprising portions of said first coating intermixed with portions of said second coating.

2. The method of claim 1 wherein said first coating is applied to have a thickness of about 9 to 15 microns, and said second coating is applied to have a thickness of about 3 to 8 microns.

3. The method of claim 2 further including the steps of flashing said first coating and said second coating with infrared energy, and then curing said first coating and said second coating with ultraviolet light.

4. The method of claim 1 wherein said interface layer is formed to have a thickness of about 0.25 to 1.0 micron.

5. The method of claim 4 wherein said plastic is polycarbonate.

6. The method of claim 1 further including the step of heating the first layer and said second layer.

7. The method of claim 1 further including the step of curing the first layer and said second layer with ultraviolet light.

* * * * *